(No Model.)

I. SMITH.
COMBINED HARROW AND SCRAPER.

No. 521,826. Patented June 26, 1894.

Witnesses,
Robert Everett,
G. W. Rea.

Inventor.
Isaac Smith.
By James L. Norris.
Atty.

THE NATIONAL LITHOGRAPHING COMPANY,
WASHINGTON, D. C.

UNITED STATES PATENT OFFICE.

ISAAC SMITH, OF LEXINGTON, KENTUCKY.

COMBINED HARROW AND SCRAPER.

SPECIFICATION forming part of Letters Patent No. 521,826, dated June 26, 1894.

Application filed September 28, 1893. Serial No. 486,695. (No model.)

*To all whom it may concern:*

Be it known that I, ISAAC SMITH, a citizen of the United States, residing at Lexington, in the county of Fayette and State of Kentucky, have invented new and useful Improvements in a Combined Harrow and Scraper, of which the following is a specification.

This invention relates to a harrow or combined harrow and scraper especially designed for use in preparing racing tracks though also adapted to other purposes.

The objects of the invention are to improve the draft of the harrow; to provide a conveniently operated means for raising or lowering it at either or both ends; to regulate the vertical adjustment or set of the harrow and hold the harrow teeth in the ground at any depth desired; and to combine with the harrow frame a vertically adjustable scraper or leveler.

My invention consists in the features of construction and novel combinations of parts in a harrowing machine as hereinafter more particularly described and claimed.

Figure 1:
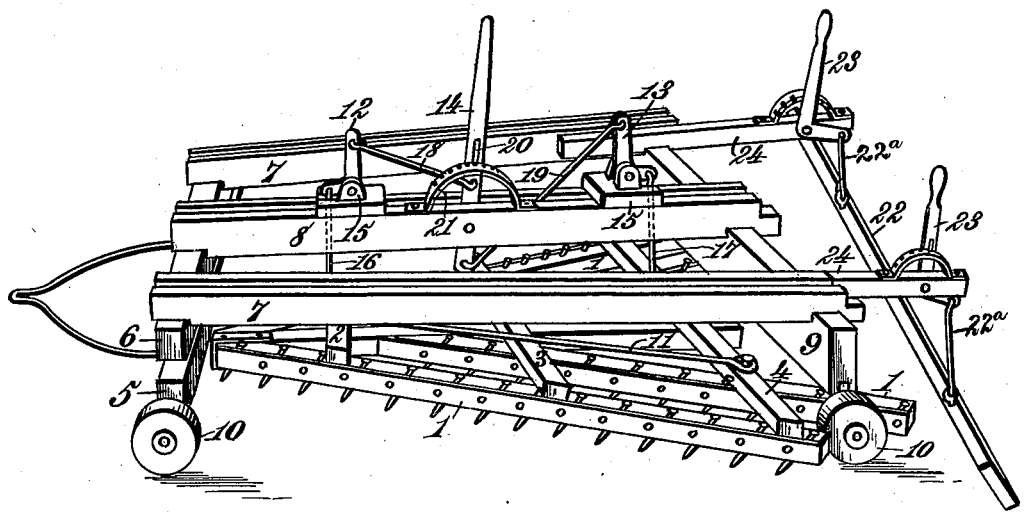
Figure 2:
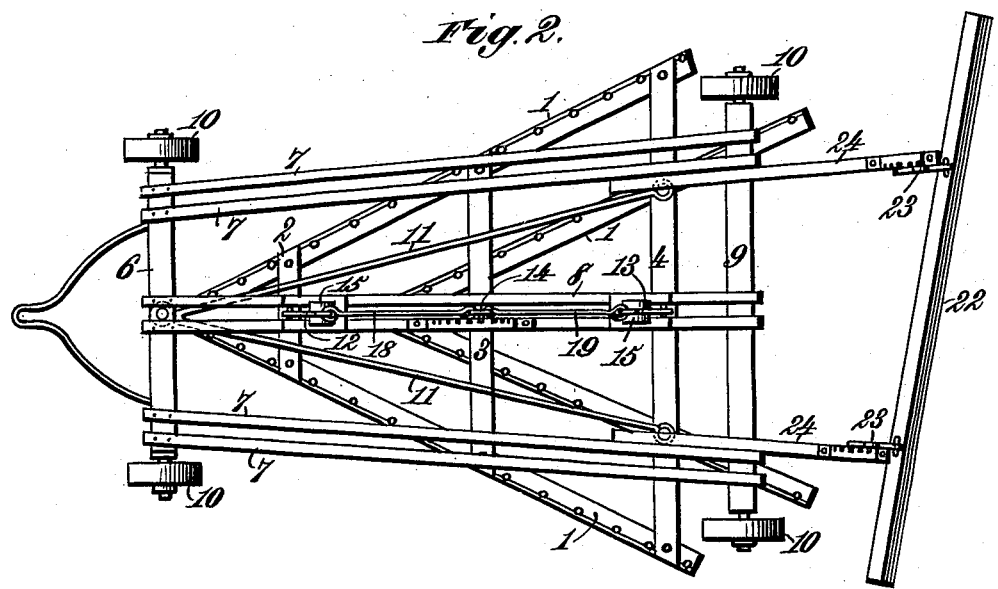

In the annexed drawings illustrating the invention—Figure 1 is a perspective of a harrow embodying my improvements. Fig. 2, is a plan of the same.

Referring to the drawings the numeral 1 designates the longitudinal, or longitudinally inclined, bars of a harrow frame connected by cross-bars 2, 3 and 4 and provided with suitable harrow teeth. Above the forward axle 5 is a bolster 6 that supports the forward ends of a series of outer longitudinally inclined bars 7 and central longitudinally arranged bars 8, the rear ends of said outer and central bars being supported on an elevated portion of the rear axle 9, as shown. The outer bars 7 of the main frame of the machine may have a diagonal or laterally inclined position somewhat corresponding with the longitudinally inclined bars of the harrow. Both sets of bars 7 and 8 are preferably arranged in pairs, slightly spaced apart, as shown. The front and rear axles, bolster 6 and bars 7 and 8 constitute the main frame of the machine, beneath which the harrow frame, composed of bars 1 and cross bars 2, 3, and 4, is adjustably suspended in such a manner as to be capable of being rigidly secured either in an elevated position or a lowered position, as may be required. On the axles 5 and 9 are wheels 10, as usual.

To the rear cross-bar 4 of the harrow frame are attached rods 11 that are extended forward and secured to the front axle of the main frame. Through these rods 11 the draft of the machine is applied directly to the rear portion of the harrow frame.

For the purpose of raising or lowering the harrow frame at either or both ends, or regulating its set, and securing it rigidly in any required vertically adjusted position a series of adjusting levers 12, 13 and 14 are arranged on the main supporting frame of the machine. The forward lever 12 and the rear lever 13 are substantially in the form of bell-cranks and have their lower arms extended, respectively forward and rearward or away from each other, as shown. These levers 12 and 13 are fulcrumed in bearings 15 supported on the two parallel centrally longitudinal bars 8 of the main frame. To the forward projecting lower arm of the front lever 12 is attached a suspension rod 16 that is extended down between the two parallel bars 8 and secured to the front cross-bar 2 of the harrow frame. By means of this lever 12, acting through the suspension rod 16, the forward portion of the harrow frame can be raised or lowered as required. The backward projecting lower arm of the rear lever 13 has attached thereto a suspension rod 17 that is extended down between the bars 8 and secured to the rear cross bar 4 of the harrow frame, so that by means of said lever and rod the rear portion of the harrow can be raised and lowered or adjusted to the required position. The central or intermediate lever 14 is fulcrumed between the two closely arranged parallel bars 8 and is extended both above and below the same. To this lever 14 at a point above its fulcrum, is attached one end of a rod 18 the other end of which is fastened to the upper end of the front lever 12, as shown. The lower end of the central lever 14 has connected thereto one end of a rod 19 the other end of which is secured to the upper end of the rear lever 13. It will thus be seen that by throwing the upper end of the central lever 14 rearward the rods 18 and 19 will be caused to draw the upper ends of the levers 12 and 13 toward each other and thereby act on the suspension rods 16 and 17 in such manner as to raise both ends of the harrow frame. By a movement of the lever 14 in the opposite direction the harrow frame will be lowered. The central or main lever 14 carries a pawl or detent 20 adapted to be engaged in a segmental rack 21, on one of the bars 8, to securely hold the suspended harrow frame in the raised or lowered position to which it may have been adjusted.

It will be observed that by applying the draft directly to the rear portion of the harrow frame through the draft rods 11 extended from the front axle the levers 12, 13 and 14 will afford a simple and reliable means for raising and lowering either or both ends of the suspended harrow frame and securing it, through the pawl 20 and rack 21, in any required vertically adjusted position to regulate the set of the machine and control the depth to which the harrow teeth shall penetrate the ground, or to hold them wholly above the road, as may be required.

An earth scraper or leveler 22 is suspended by links 22ª from bell-crank levers 23 pivoted to the rearwardly projecting arms 24 of the main frame, in such manner that by swinging the bell-crank levers the scraper or leveler is raised or lowered.

While this combined harrow and scraper is particularly designed for leveling race tracks it is obvious that it is also well adapted to other uses.

What I claim as my invention is—

1. The combination with a main frame provided with a front and a rear wheeled axle, and a harrow frame suspended beneath said main frame and adapted to bodily rise and fall parallel with the surface traversed, of draft rods jointed at their front ends to the front wheeled axle and at their rear ends to the rear portion of the said harrow frame, substantially as described.

2. The combination with a main frame provided with a front and a rear wheeled axle, and a harrow frame arranged beneath said main frame and adapted to bodily rise and fall parallel with the surface traversed, of divergent draft rods secured at their front ends to the front wheeled axle and at their rear ends to the rear portion of the harrow frame, front and rear bell-crank levers pivoted to the main frame, links pivotally connecting the bell-crank levers with the harrow frame, a main lever pivoted to the main frame between the said bell-crank levers, and links pivotally connecting the bell-crank levers with the said main lever at opposite sides of its pivotal attachment to the main frame, substantially as described.

3. The combination with a front and a rear wheeled axle, of oblique bars 7 rigidly connecting the axles, a center bar 8 connected with said axles, a harrow frame arranged beneath the bars and adapted to bodily rise and fall parallel with the surface traversed, divergent draft rods secured at their front ends to the front wheeled axle and at their rear ends to the rear portion of the harrow frame, bell-crank levers pivoted to the center bar, links pivotally connecting the bell-crank levers with the harrow frame, a main lever pivoted to the center bar between the bell-crank levers, and links connecting the bell-crank levers with the said main lever at opposite sides of its pivotal attachment to said center bar, substantially as described.

In testimony whereof I have hereunto set my hand in presence of two subscribing witnesses.

ISAAC SMITH.

Witnesses:
   THEO. LEWIS,
   A. H. DAVINPORT.